(12) United States Patent
Cox et al.

(10) Patent No.: US 10,176,138 B2
(45) Date of Patent: *Jan. 8, 2019

(54) METHOD, APPARATUS AND SYSTEM FOR CONFIGURING COUPLING WITH INPUT-OUTPUT CONTACTS OF AN INTEGRATED CIRCUIT

(71) Applicant: INTEL CORPORATION, Santa Clara, CA (US)

(72) Inventors: Christopher E. Cox, Placerville, CA (US); Kuljit S. Bains, Olympia, WA (US)

(73) Assignee: INTEL CORPORATION, Santa Clara, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 15/068,128

(22) Filed: Mar. 11, 2016

(65) Prior Publication Data

US 2016/0292119 A1   Oct. 6, 2016

Related U.S. Application Data

(63) Continuation of application No. 14/316,554, filed on Jun. 26, 2014, now Pat. No. 9,317,464.

(51) Int. Cl.
| | | |
|---|---|---|
| *G06F 3/00* | (2006.01) | |
| *G06F 13/12* | (2006.01) | |
| *G06F 13/40* | (2006.01) | |
| *G06F 13/38* | (2006.01) | |
| *G06F 11/30* | (2006.01) | |
| *G06F 11/22* | (2006.01) | |
| *G06F 11/34* | (2006.01) | |

(52) U.S. Cl.
CPC ...... *G06F 13/4068* (2013.01); *G06F 11/2221* (2013.01); *G06F 11/3027* (2013.01); *G06F 11/3051* (2013.01); *G06F 11/3089* (2013.01); *G06F 11/349* (2013.01); *G06F 13/385* (2013.01); *G06F 13/4022* (2013.01)

(58) Field of Classification Search
CPC .................................. G06F 3/00; G06F 13/12
See application file for complete search history.

(56) References Cited

U.S. PATENT DOCUMENTS

| | | | |
|---|---|---|---|
| 2009/0238021 A1* | 9/2009 | Ban .......................... | G11C 7/22 365/222 |
| 2013/0036255 A1* | 2/2013 | Fai .......................... | G06F 11/267 711/103 |
| 2015/0006826 A1* | 1/2015 | Yong ...................... | G11C 17/16 711/147 |

* cited by examiner

*Primary Examiner* — David E Martinez
(74) *Attorney, Agent, or Firm* — Womble Bond Dickinson (US) LLP

(57) ABSTRACT

Techniques and mechanisms for configuring an integrated circuit to couple to, and exchange data with, a hardware interface. In an embodiment, the integrated circuit comprises a data channel including a plurality of bits, configuration logic, and a plurality of contacts including a first contact group and a second contact group. In response to a signal indicating connectivity of the integrated circuit to the interface, a mode of the configuration logic is selected to couple the plurality of bits to one of the first contact group and the second contact group.

18 Claims, 7 Drawing Sheets

METHOD, APPARATUS AND SYSTEM FOR CONFIGURING COUPLING WITH INPUT-OUTPUT CONTACTS OF AN INTEGRATED CIRCUIT

CROSS-REFERENCE TO RELATED APPLICATIONS

This application is a continuation of U.S. patent application Ser. No. 14/316,554, filed on Jun. 26, 2014, the entire contents of which are hereby incorporated by reference herein.

BACKGROUND

1. Technical Field

Embodiments described herein generally relate to integrated circuit devices and more particularly, but not exclusively, to communication with a packaged memory device.

2. Background Art

To enable electronic equipment such as laptops and mobile phones to become smaller, integrated circuit (IC) packages that may be contained in these devices have been becoming smaller. One approach for reducing the size of electronic packages includes stacking two or more chips or dice in these packages. Each of these dice may be, for example, a processor, input/output device, graphical co-processor, a digital signal processor, nonvolatile and/or volatile memory, and the like.

Conventional IC packages may include more than one IC die. Such packages may provide robust communication between the included IC dice, improved processing power per unit area and/or increased functionality per unit area. Many packaging systems exist for protecting multiple dice and for coupling the IC dice to each other and/or to various external elements. However, the arrangement of an individual IC's input/output (I/O) contacts has, to date, constrained whether and/or how that IC might be adaptable for use in such a packaging system. By contrast, there is an increasing need for ICs to be utilized in various custom packaging, package-on-package (POP) and/or other use cases. Current packaging techniques have not adequately met this increasing need.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously relate to techniques and mechanisms for configuring an integrated circuit (IC) to provide a group of data signal paths. The IC may include logic which is configurable to implement a given mode—i.e. one of a plurality of possible modes—wherein bit lines of a data channel are coupled to a particular subset of a plurality of I/O contacts. Configuration of the IC may accommodate a particular type of connectivity of the IC to an interface—e.g. where such connectivity includes a particular pairing of individual I/O contacts of the IC each with a respective contact of the interface.

Figure 1:
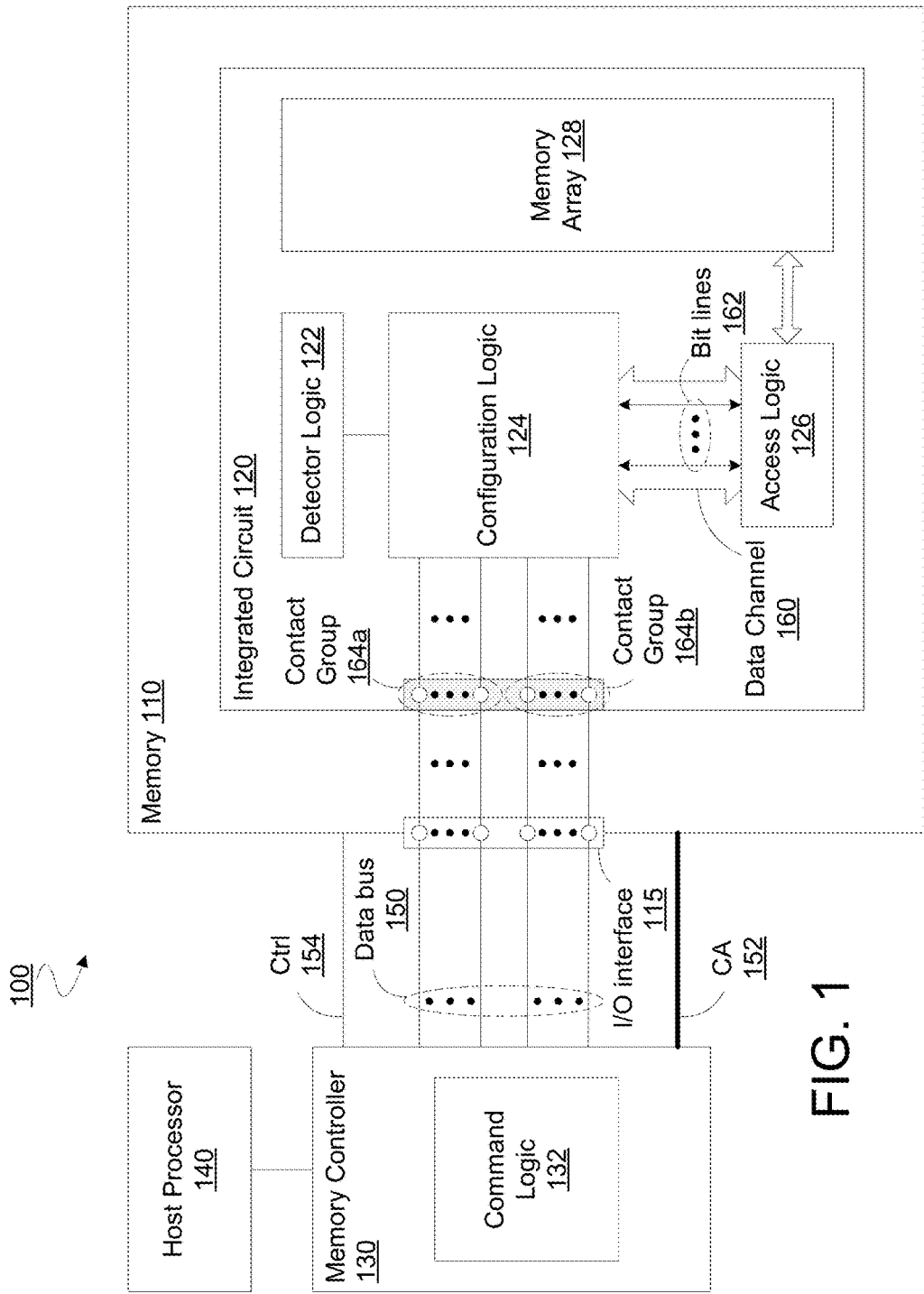
FIG. 1 is a block diagram illustrating elements of a system for configuring an integrated circuit according to an embodiment.

FIG. 1 illustrates elements of a system 100 for configuring an integrated circuit according to an embodiment. System 100 may, for example, include (or operate as a component of) a personal computer such as a desktop computer, laptop computer, a handheld computer—e.g. a tablet, palmtop, smart phone, media player, and/or the like—and/or other such computer system. Alternatively or in addition, system 100 may be configured for operation as a server, workstation, or other such computer system.

System 100 may include memory 110 and a memory controller 130 coupled thereto—e.g. where memory controller 130 is to provide access to memory 110 for a host processor 140 or other host agent which is included in or coupled to system 100. In an embodiment, memory 110 includes a hardware input/output (I/O) interface 115 to couple memory 110 to memory controller 130. Memory 110 may include any of a variety of types of memory technology that, for example, have rows of memory cells, where data is accessible via a wordline or the equivalent. In one embodiment, memory 110 includes dynamic random access memory (DRAM) technology. Memory 110 may be a packaged device such as a memory component within a larger set of memory (not shown) of system 100. For example, memory 110 may be a DRAM device of a memory module such as a dual in-line memory module (DIMM).

For the purpose of illustrating certain features of various embodiments, system 100 is discussed herein with respect to techniques and mechanisms for an integrated circuit (IC) 120 of memory 110 to exchange communications with memory controller 130. However, such discussion may be extended to apply to a memory IC communicating, according to different embodiments, with any of a variety of one or more additional or alternative external agents.

In an embodiment, IC 120 comprises a memory array 128, which represent one or more logical and/or physical groups of memory. An example of one such grouping of memory is a bank of memory resources which, for example, may include an array of storage elements arranged in rows and columns. Memory 110 may include access logic 126 to facilitate, at least in part, access to memory array 128—e.g. where such access is provided for servicing one or more commands from memory controller 130. Access logic 126 may include, or operate in conjunction with, logic of memory 110 which provides resource access according to conventional techniques—e.g. where functionality of detector logic 122, configuration logic 124 and/or access logic 126 supplements such conventional techniques with additional functionality discussed herein. By way of illustration and not limitation, access logic 126 may include or couple to column logic and/or row logic (not shown) which are used to decode an access instruction to the proper memory location within memory array 128.

In an embodiment, memory controller 130 includes command logic 132—e.g. comprising any of a variety of hardware logic and/or executing software logic—to send commands to one or more memory devices. Command logic 132 may perform operations to generate, transmit or otherwise determine commands sent according to one or more conventional techniques. By way of illustration and not limitation, command logic 132 may provide command/address signaling functionality which, for example, conforms to some or all requirements of a double data rate (DDR) specification such as the DDR3 Synchronous Dynamic Random Access Memory (SDRAM) Joint Electron Device Engineering Council (JEDEC) Standard JESD79-3C, April 2008, the DDR4 SDRAM JEDEC Standard JESD79-4, September 2012, the Low Power Double Data Rate 3 (LPDDR3) SDRAM JEDEC standard JESD209-3, May 17, 2012, or the like.

Memory controller 130 may send commands or instructions to memory 110 over one or more buses, as represented by the illustrative command/address bus CA 152. Such commands may be interpreted by IC 120—e.g. including IC 120 decoding command information to perform a variety of access functions and/or decoding address information with column logic and/or row logic. For example, such logic may access a specific location in memory array 128 with a combination of a column address strobe or signal CAS and a row address strobe or signal RAS (not shown). Rows of memory may be implemented in accordance with known memory architectures or their derivatives. Briefly, a row of memory array 128 may include one or more addressable columns of memory cells, as identified by the CAS. The rows may each be variously addressable via the RAS.

Access to memory array 128 may be for the purpose of writing data exchanged—and/or reading data to be exchanged—via a data bus coupled to I/O hardware of memory 110. For example, N signal lines DQ(1:N) of a data bus 150—e.g. a bi-directional data bus—may couple I/O circuitry of memory 110—such as the illustrative I/O interface 115—to memory controller 130 and/or one or more other devices (not shown). I/O interface 115 may include a plurality of contacts—e.g. including pad, balls, pins or other such conductive structures—each to couple to a respective signal line of data bus 150.

Exchanges via data bus 154 and/or CA 152 may be supplemented with and/or regulated by clock, address strobe, write enable and/or other control signaling exchanged between memory controller 130 and IC 120—e.g. via the illustrative one or more control lines Ctrl 154. Data bus 150, CA 152 and Ctrl 154 may each be part of a single interconnect coupling memory controller 130 to memory 110. In an embodiment, I/O interface 115 further couples to CA 152 and/or Ctrl 154.

IC 120 may include circuitry to implement any of various possible groups of signal paths for exchanging data to and/or from IC 120. For example, configuration logic 124 may be configured, in response to detector logic 122, to couple a plurality of bit lines to a particular group of I/O contacts of IC 120. Such contacts may be grouped at least insofar as they are available to be selected together as a group for coupling to, or decoupling from, a particular plurality of bit lines. For brevity, a group of contacts is also referred to herein as a "contact group."

By way of illustration and not limitation, IC 120 may include a data channel 160 coupled between access logic 126 and configuration logic 124. During operation of integrated circuit 120, data channel 160 may variously exchange data which is read from (and/or is to be written to) memory array 128 by access logic 126. Such data may be variously exchanged to and/or from IC 120 via some subset of a plurality of contacts which include, for example, the illustrative contact group 164a and contact group 164b. Configuration logic 124 may selectively provide communicative coupling between data channel 160 and a particular contact group. The contact groups 164a, 164b may variously comprise pads, vias and/or other conductive I/O structures.

Data channel 160 may comprise a plurality of bit lines—e.g. as represented by the illustrative bit lines 162. Bit lines 162 may comprise only a nibble (4 bits), a byte (8 bits), a word (16 bits) or other subset of some larger number of bit lines of data channel 160. Depending on a mode of operation of configuration logic 124, bit lines 162 may be selectively coupled to only one of two (or more) available groups of contacts of IC 120.

For example, a first mode of configuration logic 124 may include one or more switches, fuses or other circuit elements being set to variously couple bit lines 162 each to a different respective one of contact group 164a. In such a first mode, bit lines 162 may be decoupled from, or otherwise prevented from exchanging signals with, any contact of contact group 164b. By contrast, a second mode of configuration logic 124 may similarly couple bit lines 162 each to a different respective one of contact group 164b—e.g. rather than bit lines 162 being coupled to any contact of contact group 164a.

A particular mode of configuration logic 124 may be selected to accommodate a particular connectivity of contact group 164a and/or contact group 164b relative to I/O interface 115. Such connectivity may include, for example, a particular pairing of individual I/O contacts of IC 120 each with a respective contact of I/O interface 115. Alternatively or in addition, a particular mode of configuration logic 124 may be selected to accommodate a particular state of connectivity of I/O interface 115 relative to data bus 150. By providing various selectable modes of configuration logic 124, certain embodiments allow for a wider variety of applications for IC 120—e.g. where IC 120 may couple to and operate with a wider variety of interfaces.

Detector logic 122 may select a mode of configuration logic 124 based on a signal which is sent to IC 120—e.g. from memory controller 130. IC 120 may include one or more contacts—e.g. of the plurality of contacts including contact groups 164a, 164b—which are to receive signaling which specifies or otherwise indicates, for example, how IC 120 is coupled to I/O interface 115 and/or how I/O interface 115 is coupled to data bus 150.

Such signaling may be based on memory controller 130 writing to a mode register or other repository (not shown) which is included in or coupled to detector logic 122. Alternatively, such signaling may be based on a given contact of IC 120 (not shown)—e.g. a contact coupled to I/O interface 115—being strapped to a fixed voltage level. Such a contact may be dedicated to signaling one of two (or more) possible types of connectivity. In an embodiment, detector logic 122 may be preconfigured to associate a particular voltage level at such a contact as corresponding to a particular mode of configuration logic 124.

Figure 2:
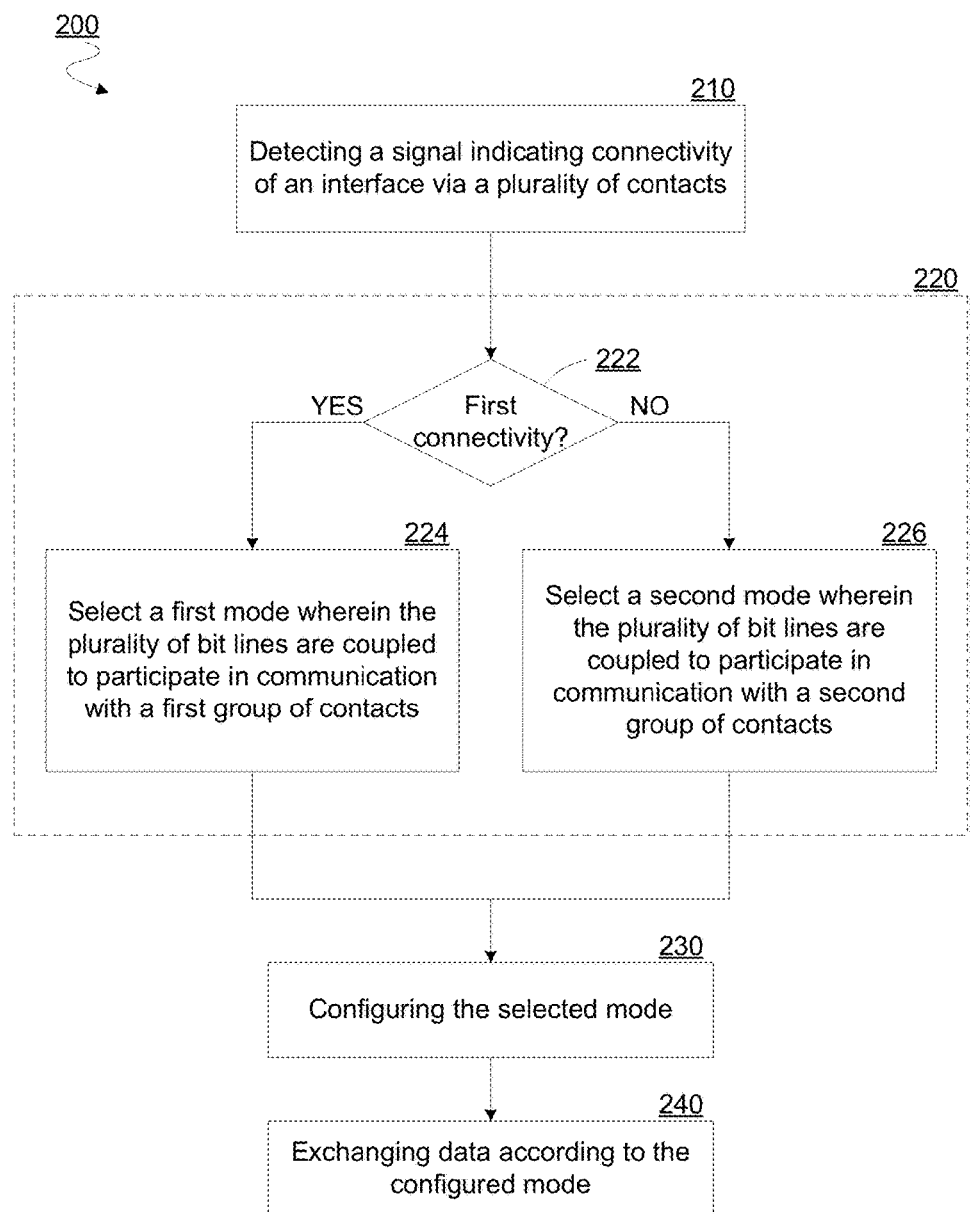
FIG. 2 is a block diagram illustrating elements of a configurable integrated circuit according to an embodiment.

FIG. 2 illustrates elements of a method 200 for operating an integrated circuit according to an embodiment. Method 200 may be performed with an integrated circuit having some or all of the features of IC 120. For example, method 200 may be performed by an IC which includes a memory array, a data channel including a plurality of bit lines, configuration logic coupled to the memory array via the data channel, a plurality of contacts coupled to the data channel via the configuration logic, and detector logic which may determine one of multiple possible modes of the configuration logic.

Method 200 may include, at 210, detecting a signal indicating connectivity of an interface (e.g. I/O interface 115) to the integrated circuit via a plurality of contacts of the integrated circuit. The signal may indicate a particular type of connectivity of the interface to the IC. For example, detector logic of the integrated circuit may be preconfigured to associate the signal detected at 210 with particular signaling functionality to be provided by certain contacts of the IC. Such signaling functionality may accommodate a particular pairing of such IC contacts each with a corresponding contact of the interface coupled thereto.

The detecting at 210 may include the detector logic receiving information from a mode register or other such repository of the integrated circuit. Alternatively, the integrated circuit may include an I/O contact dedicated to receiving a mode control signal, wherein the detecting at 210 includes detecting that the dedicated contact is strapped—i.e. hardwired—to a voltage level which is recognized as corresponding to a particular mode.

In response to the signal detected at 210, method 200 may perform, at 220, one or more operations to select one of a plurality of modes of the configuration logic. The plurality of modes may each correspond to a different respective contact group of the integrated circuit. By way of illustration and not limitation, the one or more operations at 220 may include determining, at 222, whether the signal detected at 210 indicates a first type connectivity—e.g. a first correspondence of IC contacts each with a respective I/O interface contact. The first type of connectivity may be distinguished from second, third and/or other connectivity types which might otherwise result in method 200 selecting an alternative mode of the configuration logic.

Where the signal detected at 210 indicates the first connectivity, a first mode of the configuration logic may be selected at 224, wherein a plurality of bit lines of the data channel are coupled to participate in communication with a first group of contacts of the plurality of contacts. In the first mode, such a plurality of bit lines may be coupled for communication via the first group of contacts instead of a second group of contacts. In an embodiment, the first mode includes the plurality of bit lines each being coupled to a different respective pair of contacts of the first contact group—e.g. where each such pair of contacts is to exchange a respective differential signal pair for communication with the bit line coupled thereto. The plurality of bit lines may include only a subset—e.g. a nibble, byte, word, long word or the like—of all bit lines of the data channel. In an embodiment, the data channel further comprises another plurality of bit lines which may be similarly selected for coupling to (or decoupling from) a particular contact group of the plurality of contacts.

Where the signal detected at 210 instead indicates some other connectivity (e.g. of a second connectivity type), a second mode of the configuration logic may be selected at 226, wherein the plurality of bit lines are coupled to participate in communication with a second contact group of the plurality of contacts. The second contact group may include, for example, only contacts which do not belong to the first contact group. Similar to the first mode, the second mode may include the plurality of bit lines each being coupled to a different respective pair of contacts of the second contact group. In the second mode, the plurality of bit lines may be decoupled from or otherwise prevented from communication with the first contact group.

Method 200 may further comprise, at 230, configuring the selected one of the plurality of modes of the configuration logic. For example, the configuration logic may include switch logic coupled to each of the plurality of bit lines, and further coupled to each contact of the first contact group and each contact of the second contact group. In such an embodiment, the configuring at 230 may include providing a switch control signal to transition the switch logic between a first state and a second state. The first state of such switch logic may couple each of the plurality of bit lines to a different respective one of the first contact group. Similarly, the second state of such switch logic may couple each of the plurality of bit lines to a different respective one of the second contact group. In another embodiment, the selected mode may be configured at one of operations 224, 226. Subsequently, method 200 may include, at 240, participating in an exchange of data according to the mode configured at 230—e.g. where the exchange is between the integrated circuit and a memory controller or other agent coupled to the integrated circuit via the I/O interface.

Figure 3:
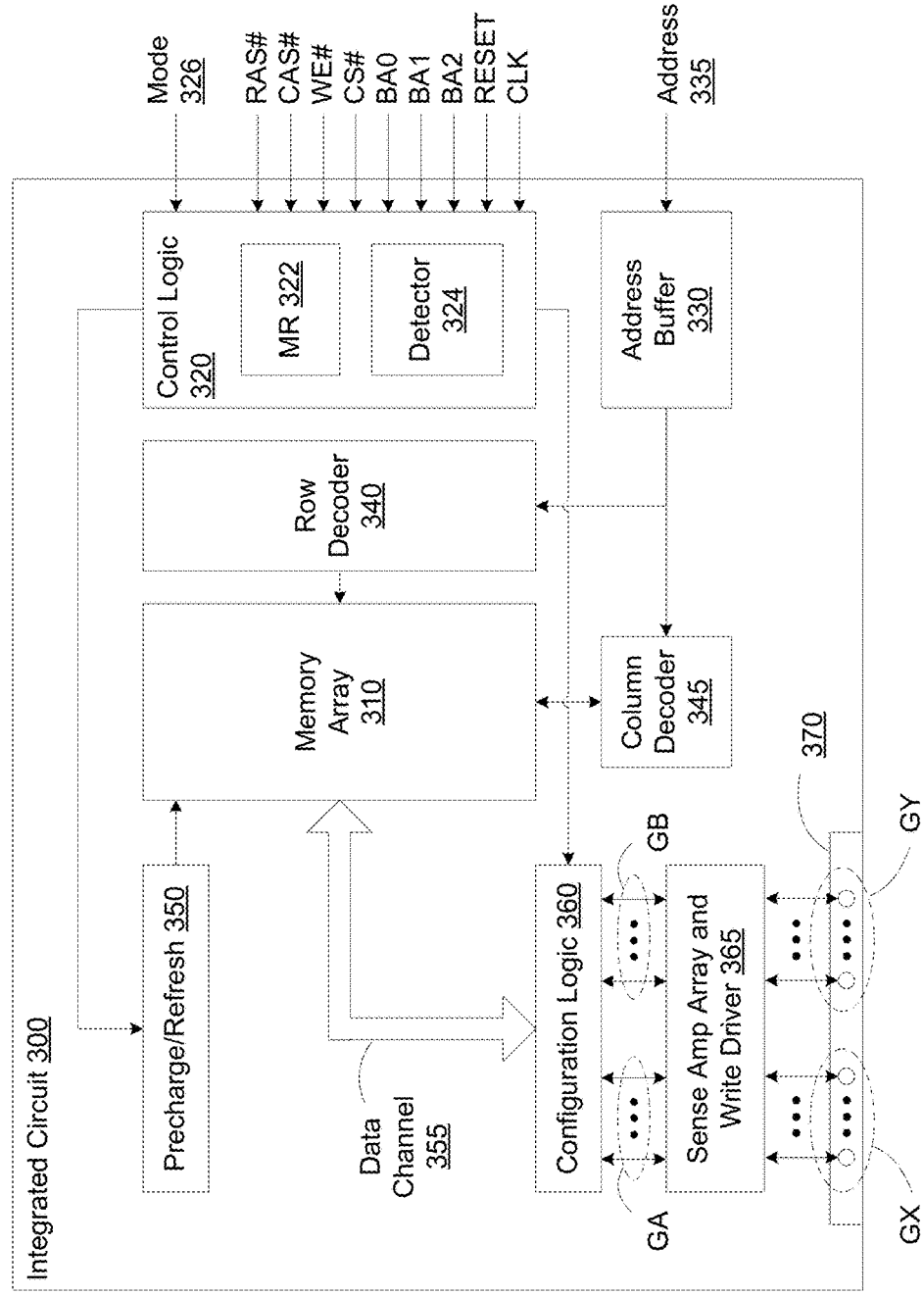
FIG. 3 is a flow diagram illustrating elements of a method for operating a configurable integrated circuit according to an embodiment.

Referring now to FIG. 3, a block diagram of a memory integrated circuit 300 is illustrated. Memory IC 300 may be included in a packaged memory device such as that of a memory module or the like. The memory integrated circuit 300 represents one example of structures to implement some or all of the features of IC 120, for example. However, one skilled in the art would appreciate, in view of the discussion herein, that any of a variety of additional or alternative structures may provide such features according to various embodiments.

The memory IC 300 includes a memory array 310, a row decoder 340, bit line precharge/refresh logic 350, a column decoder 345, a sense amp array and write driver block 365, control logic 320, an address buffer 330 and configuration logic 360. IC 300 may include one or more mode registers—as represented by the illustrative mode register MR 322 included in or coupled to control logic 320—with a plurality of bits that can be set/initialized to control functionality of the memory IC 300. MR 322 may include bit storage circuits to store some or all such bits. The bits of MR 322 may be set by applying the appropriate bit settings on address lines 335 or data lines 370 coincident with a load strobe. The load strobe may be generated by toggling one or more of the control lines that are coupled into the control logic 320 of the integrated circuit 300. The one or more control lines may include, for example, row address strobe RAS#, column address strobe CAS#, write enable WE#, chip select CS#, bank selects BA0, BA1, BA2, RESET RST#, clock CLK, and other standard memory integrated control inputs. The control signals on the one or more control lines may include active low signals and/or active high signals. Active low signals indicate an inverted true condition while active high signals indicate a non-inverted true condition.

An address buffer 330 may couple to a plurality of address signal lines 335 so as to couple addresses to the column decoder 345 and/or the row decoder 340. The address buffer 330 may latch the address signals on the internal address signal lines to hold them for the decoders 340, 345. Detector logic 324 may be coupled to receive—e.g. from MR 322—a signal indicating a particular type of connectivity of IC 300 to an I/O interface (not shown). Alternatively, such a signal may be provided via a control signal Mode 326 which is dedicated to specifying or otherwise indicating a particular connectivity of IC 300 to an interface (not shown)—e.g. including connectivity via a data I/O bus interface 370. In response to such a signal, detector 324 may select a mode of configuration logic 360—e.g. as discussed herein with respect to method 200.

The selected mode of configuration logic 360 may couple a subset of the bit lines of data channel 355 to a particular one of multiple contact groups GX, . . . , GY of data I/O bus interface 370. For example, in a first mode, a plurality of bit lines (not shown) of data channel 355 may be coupled to contact group GX via a group of signal lines GA and the sense amp array and write driver block 365. By contrast, a second mode of configuration logic 360 may instead couple such a plurality of bit lines to contact group GY via another group of signal lines GB and the sense amp array and write driver block 365.

The sense amp array and write driver block 365 couples to the data input/output (I/O) bus via configuration logic 360 and may receive control signals from the control logic 320 to read data from the memory array or write data into the memory array 310. The sense amp array and write driver block 365 receives data to be written into the memory array 310 and drives data out that has been read from the memory array 310 over the data input/output (I/O) bus 370. The data input/output (I/O) bus interface 370 may couple to bidirectional data lines of the memory IC 300 that, for example, may be 4, 8 or 16 bits wide.

The sense amp array and write driver block 365 may include sense amplifiers to determine whether a logical one or logical zero has been stored within the accessed memory cells during a read operation. The addressed memory cells try to drive a logical one or logical zero onto the selected bit lines of the memory array during the read operation. The sense amplifiers detect whether a logical one or logical zero has been driven out by the addressed memory cells onto the selected bit lines of the memory array during the read operation. The sense amp array and write driver block 365 may further include write drivers to drive a logical one or logical zero onto the selected bit lines of the memory array and into the addressed memory cells during a write operation.

The precharge/refresh block 350 couples to the bit lines in the memory array 310. The precharge/refresh block 350 may precondition the bit lines prior to addressing the memory cells during a read or write operation. The precharge/refresh block 350 may also refresh the data stored in the memory cells of the memory array 310 during periods of inactivity.

Figure 4:
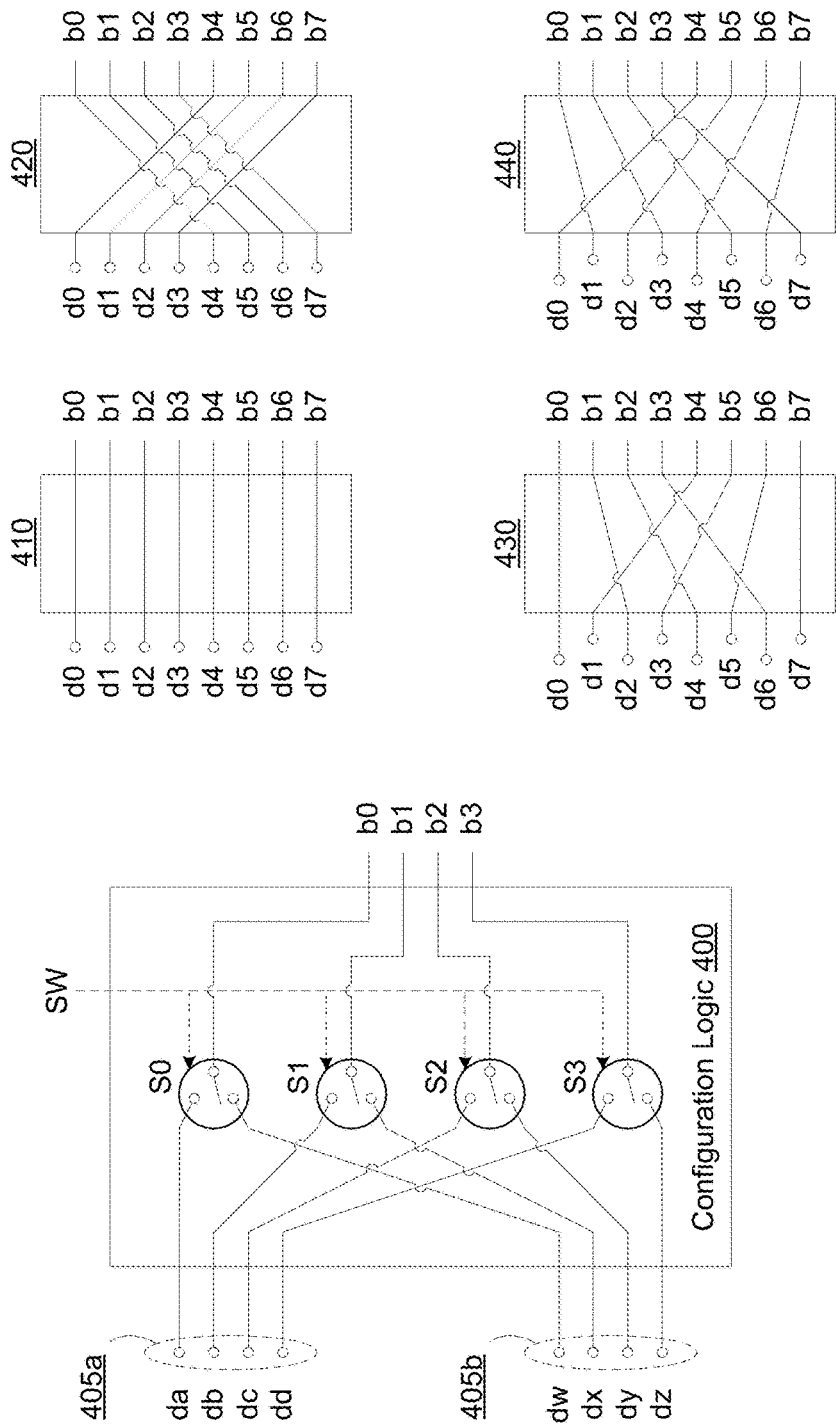
FIG. 4 illustrates respective elements of various operational modes for an integrated circuit according to an embodiment.

FIG. 4 illustrates elements of various modes of configuration logic each according to a respective embodiment. The modes illustrated in FIG. 4 may represent operational states of configuration logic 124 or configuration logic 360, for example. In an embodiment, some or all such modes may be variously selected according to techniques of method 200.

For example, configuration logic 400 may be coupled to a plurality of bit lines b0-b3 of a data channel, to a contact group 405a comprising contacts da-dd, and to another contact group 405b comprising contacts dw-dz. The contact groups 405a, 405b may each be available for selection to be coupled, as a group, to the plurality of bit lines b0-b3. By way of illustration and not limitation, configuration logic 400 may include switch logic—as represented by the illustrative switches S0, S1, S2, S3—which are each to receive a signal SW indicating a mode for configuration logic 400. Based on SW, switches S0-S3 may each be set to a respective switch state for implementing the mode, where such switch states variously couple bits b0-b3 each to a respective contact of one (e.g. only one) of contact groups 405a, 405b.

In an embodiment, any allocation of contacts for coupling to a plurality of bit lines is on a per-group basis. By way of illustration and not limitation, for any mode of configuration logic 400 which couples one of bit lines b0-b3 to a contact of contact group 405a, the mode may couple all of bit lines b0-b3 each to a respective contact of contact group 405a. Alternatively or in addition, for any mode of configuration logic 400 which couples one of bit lines b0-b3 to a contact of contact group 405b, the mode may couple all of bit lines b0-b3 each to a respective contact of contact group 405b.

Configuration logic 400 is shown as including switches S0-S3 coupled directly to contacts da-dd and contacts dw-dz. Furthermore, contact groups 405a, 405b are each shown as including a total number of contacts which is equal to a total number of bit lines b0-b3. However, in an alternate embodiment, one or more contact groups may be coupled only indirectly to configuration logic 400 and/or may each have a total number of contacts which is different than the total number of bit lines b0-b3.

For example, instead of being coupled directly to contacts da-dd, switches S0-S3 may, in another embodiment, be coupled (respectively) to pairs of contacts DA/DA#, DB/DB#, DC/DC#, DD/DD# each via respective differential signal pair converter circuits. Alternatively or in addition, instead of being coupled to contacts dw-dz, switches S0-S3 may be coupled (respectively) to pairs of contacts DW/DW#, DX/DX#, DY/DY#, DZ/DZ# each via respective differential signal pair converter circuits. In such an embodiment, a first mode of configuration logic 400 may couple bit lines b0-b3, respectively, to contact pairs DA/DA#, DB/DB#, DC/DC#, DD/DD# of a first contact group. Similarly, a second mode of configuration logic 400 may couple bit lines b0-b3, respectively, to contact pairs DW/DW#, DX/DX#, DY/DY#, DZ/DZ# of a second contact group. The selected mode may provide for the integrated circuit to exchange data via differential signaling.

FIG. 4 further illustrates various modes 410, 420, 430, 440 of respective configuration logic according to different embodiments. Modes 410, 420, 430, 440 are illustrated as variously coupling bit lines b0-b7 to respective ones of contacts d0-d7. However, the particular number and arrangement of bit lines b0-b7 and contacts d0-d7 are merely illustrative, and not limiting on certain embodiments. To avoid obscuring certain features of some embodiments, the various correspondence between bit lines and contact groups is shown for modes 410-440 without showing particular switch, fuse or other circuit mechanisms for achieving such correspondence.

In mode 410, a first plurality of bits b0-b3 are coupled to a first contact group including contacts d0-d3. Mode 410 also includes a second plurality of bits b4-b7 being coupled to a second contact group including contacts d4-d7. Mode 420 may be an alternative mode for configuration logic which implements mode 410. For example, in mode 420, the first plurality of bits b0-b3 are instead coupled to the second contact group d4-d7, and the second plurality of bits b4-b7 are instead coupled to the first contact group d0-d3. In an embodiment, modes 410, 420 allow a sequence of successively more significant bits (for a byte, word, long word or other amount of data) to be reordered relative to one another at a location which is between I/O contacts of an integrated circuit and a memory array of the integrated circuit. For example, modes 410, 420 may allow for selection of how different nibbles of data are to be exchanged at an I/O interface.

In mode 430, a first plurality of bits b0-b3 are coupled to a first contact group including alternate (e.g. "even") contacts d0, d2, d4, d6. Such contacts may be "alternate" with respect to a physical layout of the interface. Mode 430 also includes a second plurality of bits b4-b7 being coupled to a second contact group including other alternate (e.g. "odd") contacts d1, d3, d5, d7. Mode 440 may be an alternative to mode 430. For example, in mode 440, the first plurality of bits b0-b3 may be coupled to the second contact group d1, d3, d5, d7, and the second plurality of bits b4-b7 may be coupled to the first contact group d0, d2,d4, d6. In an embodiment, modes 430, 440 allow different interfaces to be accommodated. For example, an ability to select between modes 430, 440 may accommodate connectivity to an I/O interface having any of multiple different physical layouts.

By way of illustration and not limitation, a contact group of an IC may include contacts arranged in a sequence (e.g. along a line), wherein each contact of the contact group is adjacent to a respective other one of the same contact group in the sequence. In another embodiment, each contact of such a contact group may be adjacent to a respective contact of a different contact group in the sequence. A plurality of contacts of such an IC may be arranged to form a first row including a first contact group and a second row including a second contact group. Such a first contact group may be arranged along one side of the integrated circuit—e.g. wherein the second contact group is arranged along a second side of the integrated circuit.

Figure 5:
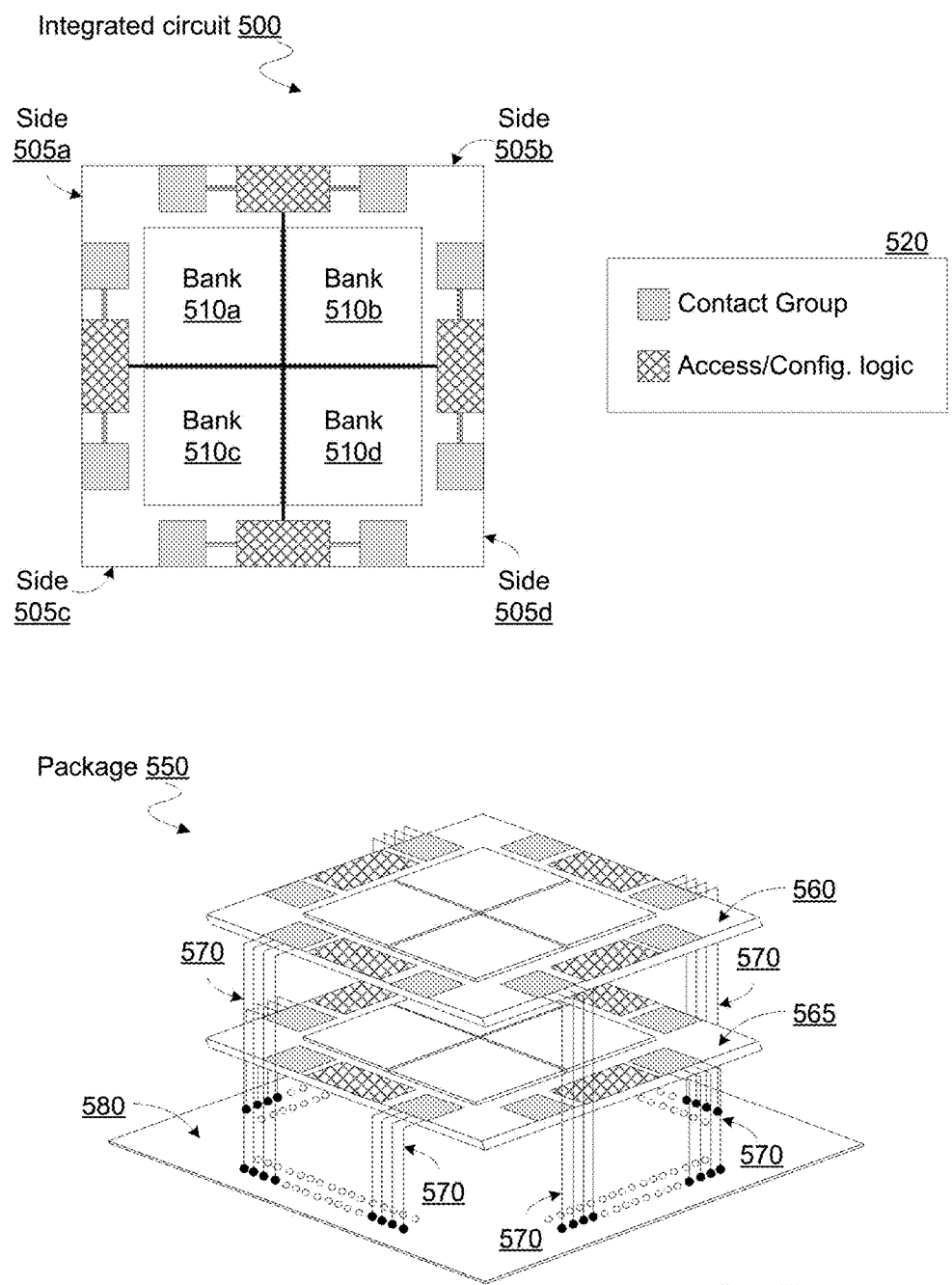
FIG. 5 is a block diagram illustrating elements of a configurable packaged memory device according to an embodiment.

FIG. 5 illustrates elements of a configurable integrated circuit 500 such as one included in a packaged memory device 550 according to an embodiment. Integrated circuit 500 may include some or all of the features of IC 120 or IC 300, for example. In an embodiment, IC 500 is configurable, according to method 200, for operation in a memory device such as package 550.

IC 500 may comprise a plurality of memory storage resources, as illustrated by the representative banks 510a, 510b, 510c, 510d. As indicated in legend 520, some or all sides 505a, 505b, 505c, 505d of IC 500 may each include, or be proximate to, one or more contact groups of IC 500. The particular number and arrangement of contact groups of IC 500 are merely illustrative, and not limiting on certain embodiments. The configuration logic (and in some embodiments, access logic) of IC 500 may be variously coupled between such contact groups and a data channel (or channels) for accessing banks 510a, 510b, 510c, 510d. The configuration logic may be placed in a mode which couples a plurality of bit lines of the data channel to exchange data with a particular one of the contact groups.

The availability of multiple such modes allows IC 500 to be configured for connectivity to I/O hardware of any of various types of packaged memory devices which may include IC 500. For example, package 550 may include a stack comprising integrated circuits 560, 565 each having the features of IC 500. Respective contact groups of integrated circuits 560, 565 may be variously coupled—e.g. via wire bonds 570—to an I/O interface 580 of IC 550. I/O interface 580 may comprise a ball grid array, a set of pins, pads and/or the like. Respective configuration logic of ICs 560, 565 may be set to different modes which allow efficient connectivity to I/O interface 580. For example, connectivity to I/O interface 580 may be asymmetric or otherwise vary as between ICs 560, 565 for relatively simplified routing of wire bonds 570—e.g. where relatively little, if any, wire bond cross-over is needed for such connectivity.

Figure 6:
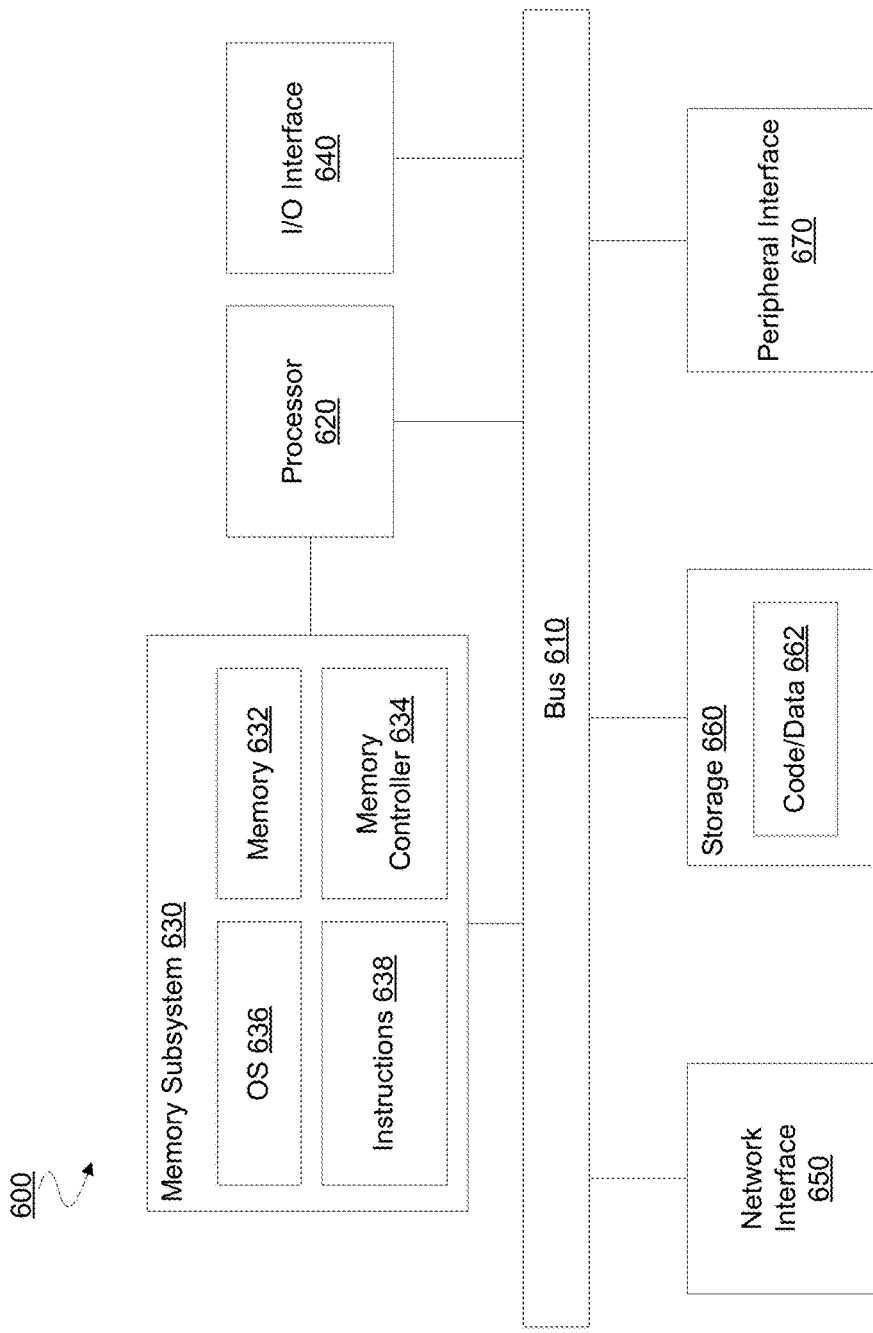
FIG. 6 is a block diagram illustrating elements of a computer system including a memory operated according to an embodiment.

FIG. 6 is a block diagram of an embodiment of a computing system in which memory accesses may be implemented. System 600 represents a computing device in accordance with any embodiment described herein, and may be a laptop computer, a desktop computer, a server, a gaming or entertainment control system, a scanner, copier, printer, or other electronic device. System 600 may include processor 620, which provides processing, operation management, and execution of instructions for system 600. Processor 620 may include any type of microprocessor, central processing unit (CPU), processing core, or other processing hardware to provide processing for system 600. Processor 620 controls the overall operation of system 600, and may be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 630 represents the main memory of system 600, and provides temporary storage for code to be executed by processor 620, or data values to be used in executing a routine. Memory subsystem 630 may include one or more memory devices such as read-only memory (ROM), flash memory, one or more varieties of random access memory (RAM), or other memory devices, or a combination of such devices. Memory subsystem 630 stores and hosts, among other things, operating system (OS) 636 to provide a software platform for execution of instructions in system 600. Additionally, other instructions 638 are stored and executed from memory subsystem 630 to provide the logic and the processing of system 600. OS 636 and instructions 638 are executed by processor 620.

Memory subsystem 630 may include memory device 632 where it stores data, instructions, programs, or other items. In one embodiment, memory subsystem includes memory controller 634, which provides mechanisms for accessing memory device 632. In one embodiment, memory controller 634 provides commands to access memory device 632, which includes integrated circuitry in accordance with any embodiment described herein.

Processor 620 and memory subsystem 630 are coupled to bus/bus system 610. Bus 610 is an abstraction that represents any one or more separate physical buses, communication lines/interfaces, and/or point-to-point connections, connected by appropriate bridges, adapters, and/or controllers. Therefore, bus 610 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 610 may also correspond to interfaces in network interface 650.

System 600 may also include one or more input/output (I/O) interface(s) 640, network interface 650, one or more internal mass storage device(s) 660, and peripheral interface 670 coupled to bus 610. I/O interface 640 may include one or more interface components through which a user interacts with system 600 (e.g., video, audio, and/or alphanumeric interfacing). Network interface 650 provides system 600 the ability to communicate with remote devices (e.g., servers, other computing devices) over one or more networks. Network interface 650 may include an Ethernet adapter, wireless interconnection components, USB (universal serial bus), or other wired or wireless standards-based or proprietary interfaces.

Storage 660 may be or include any conventional medium for storing large amounts of data in a nonvolatile manner, such as one or more magnetic, solid state, or optical based disks, or a combination. Storage 660 holds code or instructions and data 662 in a persistent state (i.e., the value is retained despite interruption of power to system 600). Storage 660 may be generically considered to be a "memory,"

although memory 630 is the executing or operating memory to provide instructions to processor 620. Whereas storage 660 is nonvolatile, memory 630 may include volatile memory (i.e., the value or state of the data is indeterminate if power is interrupted to system 600).

Peripheral interface 670 may include any hardware interface not specifically mentioned above. Peripherals refer generally to devices that connect dependently to system 600. A dependent connection is one where system 600 provides the software and/or hardware platform on which an operation executes, and with which a user interacts.

Figure 7:
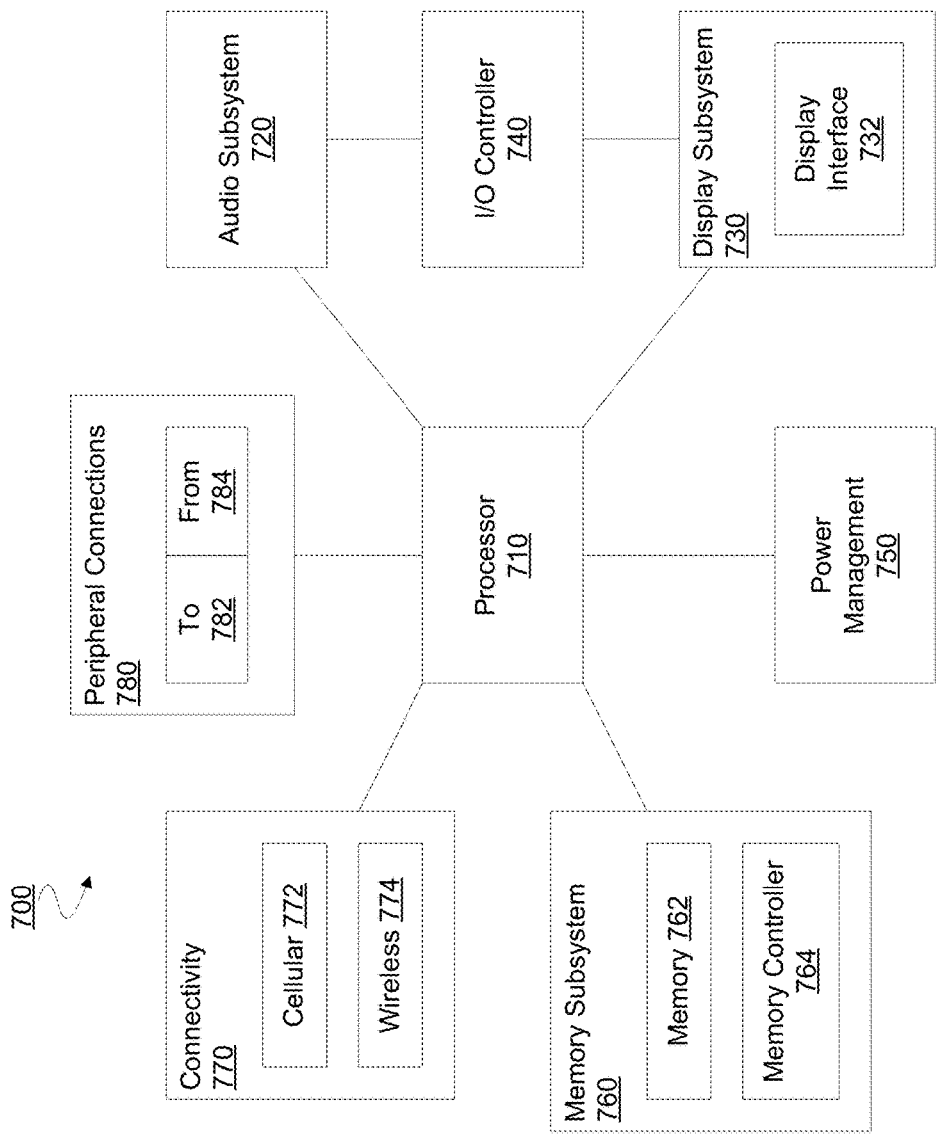
FIG. 7 is a block diagram illustrating elements of a mobile device including a memory operated according to an embodiment.

FIG. 7 is a block diagram of an embodiment of a mobile device in which memory accesses may be implemented. Device 700 represents a mobile computing device, such as a computing tablet, a mobile phone or smartphone, a wireless-enabled e-reader, or other mobile device. It will be understood that certain of the components are shown generally, and not all components of such a device are shown in device 700.

Device 700 may include processor 710, which performs the primary processing operations of device 700. Processor 710 may include one or more physical devices, such as microprocessors, application processors, microcontrollers, programmable logic devices, or other processing means. The processing operations performed by processor 710 include the execution of an operating platform or operating system on which applications and/or device functions are executed. The processing operations include operations related to I/O (input/output) with a human user or with other devices, operations related to power management, and/or operations related to connecting device 700 to another device. The processing operations may also include operations related to audio I/O and/or display I/O.

In one embodiment, device 700 includes audio subsystem 720, which represents hardware (e.g., audio hardware and audio circuits) and software (e.g., drivers, codecs) components associated with providing audio functions to the computing device. Audio functions may include speaker and/or headphone output, as well as microphone input. Devices for such functions may be integrated into device 700, or connected to device 700. In one embodiment, a user interacts with device 700 by providing audio commands that are received and processed by processor 710.

Display subsystem 730 represents hardware (e.g., display devices) and software (e.g., drivers) components that provide a visual and/or tactile display for a user to interact with the computing device. Display subsystem 730 may include display interface 732, which may include the particular screen or hardware device used to provide a display to a user. In one embodiment, display interface 732 includes logic separate from processor 710 to perform at least some processing related to the display. In one embodiment, display subsystem 730 includes a touchscreen device that provides both output and input to a user.

I/O controller 740 represents hardware devices and software components related to interaction with a user. I/O controller 740 may operate to manage hardware that is part of audio subsystem 720 and/or display subsystem 730. Additionally, I/O controller 740 illustrates a connection point for additional devices that connect to device 700 through which a user might interact with the system. For example, devices that may be attached to device 700 might include microphone devices, speaker or stereo systems, video systems or other display device, keyboard or keypad devices, or other I/O devices for use with specific applications such as card readers or other devices.

As mentioned above, I/O controller 740 may interact with audio subsystem 720 and/or display subsystem 730. For example, input through a microphone or other audio device may provide input or commands for one or more applications or functions of device 700. Additionally, audio output may be provided instead of or in addition to display output. In another example, if display subsystem includes a touchscreen, the display device also acts as an input device, which may be at least partially managed by I/O controller 740. There may also be additional buttons or switches on device 700 to provide I/O functions managed by I/O controller 740.

In one embodiment, I/O controller 740 manages devices such as accelerometers, cameras, light sensors or other environmental sensors, gyroscopes, global positioning system (GPS), or other hardware that may be included in device 700. The input may be part of direct user interaction, as well as providing environmental input to the system to influence its operations (such as filtering for noise, adjusting displays for brightness detection, applying a flash for a camera, or other features).

In one embodiment, device 700 includes power management 750 that manages battery power usage, charging of the battery, and features related to power saving operation. Memory subsystem 760 may include memory device(s) 762 for storing information in device 700. Memory subsystem 760 may include nonvolatile (state does not change if power to the memory device is interrupted) and/or volatile (state is indeterminate if power to the memory device is interrupted) memory devices. Memory 760 may store application data, user data, music, photos, documents, or other data, as well as system data (whether long-term or temporary) related to the execution of the applications and functions of system 700. In one embodiment, memory subsystem 760 includes memory controller 764 (which could also be considered part of the control of system 700, and could potentially be considered part of processor 710) to control memory 762.

Connectivity 770 may include hardware devices (e.g., wireless and/or wired connectors and communication hardware) and software components (e.g., drivers, protocol stacks) to enable device 700 to communicate with external devices. The device could be separate devices, such as other computing devices, wireless access points or base stations, as well as peripherals such as headsets, printers, or other devices.

Connectivity 770 may include multiple different types of connectivity. To generalize, device 700 is illustrated with cellular connectivity 772 and wireless connectivity 774. Cellular connectivity 772 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 774 refers to wireless connectivity that is not cellular, and may include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 780 include hardware interfaces and connectors, as well as software components (e.g., drivers, protocol stacks) to make peripheral connections. It will be understood that device 700 could both be a peripheral device ("to" 782) to other computing devices, as well as have peripheral devices ("from" 784) connected to it. Device 700 commonly has a "docking" connector to connect to other computing devices for purposes such as managing (e.g., downloading and/or uploading, changing, synchronizing) content on device 700. Additionally, a docking connector may allow device 700 to connect to certain peripherals that allow device 700 to control content output, for example, to audiovisual or other systems.

In addition to a proprietary docking connector or other proprietary connection hardware, device 700 may make peripheral connections 780 via common or standards-based connectors. Common types may include a Universal Serial Bus (USB) connector (which may include any of a number of different hardware interfaces), DisplayPort including MiniDisplayPort (MDP), High Definition Multimedia Interface (HDMI), Firewire, or other type.

In one implementation, an integrated circuit comprises a memory array, a data channel including a first plurality of bit lines, configuration logic coupled to the memory array via the data channel, and a plurality of contacts coupled to the data channel via the configuration logic. The integrated circuit further comprises detector logic to detect a signal indicating connectivity of an I/O interface to the integrated circuit via the plurality of contacts and, in response to the signal, to select one of a plurality of modes of the configuration logic. The plurality of modes includes a first mode wherein the first plurality of bit lines are coupled to participate in communication with a first group of contacts of the plurality of contacts, and a second mode wherein the first plurality of bit lines are coupled to participate in communication with a second group of contacts of the plurality of contacts.

In an embodiment, after configuration of the selected one of the plurality of modes, the integrated circuit is to exchange data with an agent coupled to the I/O interface according to the selected one of the plurality of modes. In another embodiment, the first mode includes the first plurality of bit lines coupled for communication via the first group of contacts instead of the second group of contacts. In another embodiment, the second mode includes the first plurality of bit lines coupled for communication via the second group of contacts instead of the first group of contacts.

In another embodiment, the integrated circuit further comprises a mode register to store a value specifying one of the plurality of modes, wherein the detector logic to detect the signal includes the detector logic to receive information from the mode register. In another embodiment, the plurality of contacts includes a first contact to receive the signal, wherein the detector logic to detect the signal includes the detector logic to detect that the first contact is strapped to a first voltage level.

In another embodiment, the configuration logic includes switch logic coupled to each of the first plurality of bit lines, each of the first group of contacts and each of the second group of contacts. The switch logic is to receive from the detector logic a switch control signal and, in response to the switch control signal, to transition between a first state wherein each of the first plurality of bit lines is coupled to a different respective one of the first group of contacts, and a second state wherein each of the first plurality of bit lines is coupled to a different respective one of the second group of contacts. In another embodiment, the first mode includes the first plurality of bit lines each being coupled to a different respective pair of contacts of the first group of contacts.

In another embodiment, the first plurality of bit lines comprises a nibble. In another embodiment, the first plurality of bit lines comprises a byte. In another embodiment, the first plurality of bit lines comprises a word. In another embodiment, the plurality of contacts are arranged in a sequence, wherein each of the first group of contacts is adjacent to another of the first group of contacts in the sequence. In another embodiment, each of the second group of contacts is adjacent to another of the second group of contacts in the sequence. In another embodiment, the plurality of contacts are arranged in a sequence, wherein each of the first group of contacts is adjacent to a respective contact of the second group of contacts in the sequence. In another embodiment, plurality of contacts are arranged to form a first row including the first group of contacts and a second row including the second group of contacts. In another embodiment, the first group of contacts are arranged along a first side of the integrated circuit, wherein the second group of contacts are arranged along a second side of the integrated circuit.

In another embodiment, for any mode of the configuration logic which couples one of the first plurality of bit lines one of the first group of contacts, the mode couples all of the first plurality of bit lines each to a respective one of the first group of contacts. In another embodiment, for any mode of the configuration logic which couples one of the first plurality of bit lines one of the second group of contacts, the mode couples all of the first plurality of bit lines each to a respective one of the second group of contacts. In another embodiment, for any indication to the detector logic that one of the first plurality of bit lines is to be coupled to one of the first group of contacts, the detector logic is to couple each of the first plurality of bit lines to a different respective one of the first group of contacts. In another embodiment, for any indication to the detector logic that one of the first plurality of bit lines is to be coupled to one of the second group of contacts, the detector logic is to couple each of the first plurality of bit lines to a different respective one of the second group of contacts. In another embodiment, the detector logic to select one of the plurality of modes includes the detector logic to provide to the configuration logic a single control signal which determines different respective switch states for each of a plurality of switches coupled between the first plurality of bit lines and the plurality of contacts. In another embodiment, the data channel further comprises a second plurality of bit lines, wherein the first mode further comprises the second plurality of bit lines coupled to participate in communication with the second group of contacts, and wherein the second mode further comprises the second plurality of bit lines coupled to participate in communication with the first group of contacts.

In another implementation, a method at an integrated circuit comprises detecting a signal indicating connectivity of an I/O interface to the integrated circuit via a plurality of contacts of the integrated circuit, and in response to the signal, selecting one of a plurality of modes of configuration logic of the integrated circuit, the configuration logic coupled to a memory array of the integrated circuit via a data channel including a first plurality of bit lines. The plurality of modes includes a first mode wherein the first plurality of bit lines are coupled to participate in communication with a first group of contacts of the plurality of contacts, and a second mode wherein the first plurality of bit lines are coupled to participate in communication with a second group of contacts of the plurality of contacts. The method further comprises configuring the selected one of the plurality of modes of the configuration logic.

In an embodiment, the method further comprises, after configuration of the selected one of the plurality of modes, participating in an exchange of data with an agent coupled to the integrated circuit via the interface, the exchange according to the configuration of the selected one of the plurality of modes. In another embodiment, the first mode includes the first plurality of bit lines coupled for communication via the first group of contacts instead of the second group of contacts. In another embodiment, the second mode includes the first plurality of bit lines coupled for communication via the second group of contacts instead of the first group of contacts. In another embodiment, detecting the signal includes receiving information from a mode register of the integrated circuit. In another embodiment, the plurality of contacts includes a first contact to receive the signal, wherein detecting the signal includes detecting that the first contact is strapped to a first voltage level.

In another embodiment, the configuration logic includes switch logic coupled to each of the first plurality of bit lines, each of the first group of contacts and each of the second group of contacts, wherein the method further comprises the switch logic receiving a switch control signal and, in response to the switch control signal, transitioning between a first state wherein each of the first plurality of bit lines is coupled to a different respective one of the first group of contacts, and a second state wherein each of the first plurality of bit lines is coupled to a different respective one of the second group of contacts. In another embodiment, the first mode includes the first plurality of bit lines each being coupled to a different respective pair of contacts of the first group of contacts. In another embodiment, the first plurality of bit lines comprises a nibble. In another embodiment, the first plurality of bit lines comprises a byte. In another embodiment, the first plurality of bit lines comprises a word. In another embodiment, the plurality of contacts are arranged in a sequence and each of the first group of contacts is adjacent to another of the first group of contacts in the sequence. In another embodiment, each of the second group of contacts is adjacent to another of the second group of contacts in the sequence. In another embodiment, the plurality of contacts are arranged in a sequence and each of the first group of contacts is adjacent to a respective contact of the second group of contacts in the sequence. In another embodiment, the plurality of contacts are arranged to form a first row including the first group of contacts and a second row including the second group of contacts. In another embodiment, the first group of contacts are arranged along a first side of the integrated circuit, and the second group of contacts are arranged along a second side of the integrated circuit.

In another embodiment, for any mode of the configuration logic which couples one of the first plurality of bit lines one of the first group of contacts, the mode couples all of the first plurality of bit lines each to a respective one of the first group of contacts. In another embodiment, for any mode of the configuration logic which couples one of the first plurality of bit lines one of the second group of contacts, the mode couples all of the first plurality of bit lines each to a respective one of the second group of contacts. In another embodiment, for any indication that one of the first plurality of bit lines is to be coupled to one of the first group of contacts, each of the first plurality of bit lines is coupled to a different respective one of the first group of contacts. In another embodiment, for any indication that one of the first plurality of bit lines is to be coupled to one of the second group of contacts, each of the first plurality of bit lines is coupled to a different respective one of the second group of contacts. In another embodiment, selecting one of the plurality of modes includes providing to the configuration logic a single control signal which determines different respective switch states for each of a plurality of switches coupled between the first plurality of bit lines and the plurality of contacts. In another embodiment, the data channel further comprises a second plurality of bit lines, wherein the first mode further comprises the second plurality of bit lines coupled to participate in communication with the second group of contacts, and wherein the second mode further comprises the second plurality of bit lines coupled to participate in communication with the first group of contacts.

In another implementation, a packaged memory device comprises a hardware input/output (I/O) interface and a first integrated circuit coupled to the hardware I/O interface, the first integrated circuit including a memory array, a data channel including a first plurality of bit lines, configuration logic coupled to the memory array via the data channel, a plurality of contacts coupled to the data channel via the configuration logic, and detector logic to detect a signal indicating connectivity of the I/O interface to the first integrated circuit via the plurality of contacts and, in response to the signal, to select one of a plurality of modes of the configuration logic. The plurality of modes includes a first mode wherein the first plurality of bit lines are coupled to participate in communication with a first group of contacts of the plurality of contacts, and a second mode wherein the first plurality of bit lines are coupled to participate in communication with a second group of contacts of the plurality of contacts.

In an embodiment, after configuration of the selected one of the plurality of modes, the first integrated circuit is to exchange data with an agent coupled to the I/O interface according to the selected one of the plurality of modes. In another embodiment, the first mode includes the first plurality of bit lines coupled for communication via the first group of contacts instead of the second group of contacts. In another embodiment, the second mode includes the first plurality of bit lines coupled for communication via the second group of contacts instead of the first group of contacts. In another embodiment, the first integrated circuit further comprises a mode register to store a value specifying one of the plurality of modes, wherein the detector logic to detect the signal includes the detector logic to receive information from the mode register. In another embodiment, the plurality of contacts includes a first contact to receive the signal, and wherein the detector logic to detect the signal includes the detector logic to detect that the first contact is strapped to a first voltage level.

In another embodiment, the configuration logic includes switch logic coupled to each of the first plurality of bit lines, each of the first group of contacts and each of the second group of contacts, the switch logic to receive from the detector logic a switch control signal and, in response to the switch control signal, to transition between a first state wherein each of the first plurality of bit lines is coupled to a different respective one of the first group of contacts, and a second state wherein each of the first plurality of bit lines is coupled to a different respective one of the second group of contacts. In another embodiment, the first mode includes the first plurality of bit lines each being coupled to a different respective pair of contacts of the first group of contacts. In another embodiment, the first plurality of bit lines comprises a nibble. In another embodiment, the first plurality of bit lines comprises a byte. In another embodiment, the first plurality of bit lines comprises a word. In another embodiment, the plurality of contacts are arranged in a sequence, wherein each of the first group of contacts is adjacent to another of the first group of contacts in the sequence. In another embodiment, each of the second group of contacts is adjacent to another of the second group of contacts in the sequence. In another embodiment, the plurality of contacts are arranged in a sequence, wherein each of the first group of contacts is adjacent to a respective contact of the second group of contacts in the sequence. In another embodiment, the plurality of contacts are arranged to form a first row including the first group of contacts and a second row including the second group of contacts. In another embodiment, the first group of contacts are arranged along a first side of the first integrated circuit, wherein the second group of contacts are arranged along a second side of the first integrated circuit. In another embodiment, for any mode of the configuration logic which couples one of the first plurality of bit lines one of the first group of contacts, the mode couples all of the first plurality of bit lines each to a respective one of the first group of contacts. In another embodiment, for any mode of the configuration logic which couples one of the first plurality of bit lines one of the second group of contacts, the mode couples all of the first plurality of bit lines each to a respective one of the second group of contacts.

In another embodiment, for any indication to the detector logic that one of the first plurality of bit lines is to be coupled to one of the first group of contacts, the detector logic is to couple each of the first plurality of bit lines to a different respective one of the first group of contacts. In another embodiment, for any indication to the detector logic that one of the first plurality of bit lines is to be coupled to one of the second group of contacts, the detector logic is to couple each of the first plurality of bit lines to a different respective one of the second group of contacts. In another embodiment, the detector logic to select one of the plurality of modes includes the detector logic to provide to the configuration logic a single control signal which determines different respective switch states for each of a plurality of switches coupled between the first plurality of bit lines and the plurality of contacts. In another embodiment, the data channel further comprises a second plurality of bit lines, wherein the first mode further comprises the second plurality of bit lines coupled to participate in communication with the second group of contacts, and wherein the second mode further comprises the second plurality of bit lines coupled to participate in communication with the first group of contacts.

Techniques and architectures for operating memory circuitry are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit (IC) chip comprising:
   a memory array;
   a data channel including a first plurality of bit lines that include a first bit line;
   a configuration logic including circuitry coupled to the memory array via the data channel;
   a first plurality of input/output (I/O) contacts and a second plurality of I/O contacts coupled to the configuration logic, wherein the first plurality of I/O contacts include a first I/O contact, and the second plurality of I/O contacts include a second I/O contact; and a detector logic including circuitry coupled to select one of a plurality of modes of the configuration logic in response to a connectivity of an interface to the IC chip via one of a first I/O contact group including the first plurality of I/O contacts and a second I/O contact group including the second plurality of I/O contacts, wherein any I/O contact of the second I/O contact group is an I/O contact other than any I/O contact of the first I/O contact group, the plurality of modes including:

a first mode wherein the first plurality of bit lines are each coupled to participate in data exchanges with the first I/O contact group, wherein the first bit line is coupled to exchange data with the first I/O contact, and wherein the configuration logic is configured to prevent any communication between the second I/O contact group and the data channel; and a second mode wherein the first plurality of bit lines are each coupled to participate in data exchanges with the second I/O contact group, wherein the first bit line is coupled to exchange data with the second I/O contact, and wherein the configuration logic to prevent any communication between the first I/O contact group and the data channel.

2. The IC chip of claim 1, wherein, for any mode of the plurality of modes that couples one I/O contact of the first I/O contact group to participate in data exchanges with the data channel, the mode couples each I/O contact of the first I/O contact group to participate in data exchanges with the data channel.

3. The IC chip of claim 2, wherein, for any mode of the plurality of modes that couples one I/O contact of the first I/O contact group to participate in data exchanges with the data channel, the mode prevents any communication between the second I/O contact group and the data channel.

4. The IC chip of claim 2, wherein, for any mode of the plurality of modes that couples one I/O contact of the second I/O contact group to participate in data exchanges with the data channel, the mode couples each I/O contact of the second I/O contact group to participate in data exchanges with the data channel.

5. The IC chip of claim 4, wherein, for any mode of the plurality of modes that couples one I/O contact of the second I/O contact group to participate in data exchanges with the data channel, the mode prevents any communication between the first I/O contact group and the data channel.

6. The IC chip of claim 1, wherein, for any mode of the plurality of modes, the mode prevents any communication between the data channel and at least one of the first I/O contact group and the second I/O contact group.

7. The IC chip of claim 1, wherein the first plurality of bit lines includes bitlines corresponding to a nibble.

8. The IC chip of claim 7, wherein the first plurality of bit lines each correspond to a respective bit of a byte including the nibble.

9. The IC chip of claim 7, wherein the first plurality of bit lines each correspond to a respective bit of the nibble.

10. A method at an integrated circuit (IC) chip, the method comprising:

detecting a signal indicating connectivity of an interface to the IC chip via one of a first input/output (I/O) contact group including a first plurality of I/O contacts and a second I/O contact group including a second plurality of I/O contacts, wherein the first plurality of I/O contacts include a first I/O contact, and the second plurality of I/O contacts include a second I/O contact, wherein any I/O contact of the second I/O contact group is an I/O contact other than any I/O contact of the first I/O contact group; and in response to the signal, selecting one of a plurality of modes of configuration logic of the integrated circuit, the configuration logic coupled to a memory array of the integrated circuit chip via a data channel including a first plurality of bit lines that include a first bit line, the plurality of modes including:

a first mode wherein the first plurality of bit lines are each coupled to participate in data exchanges with the first I/O contact group, wherein the first bit line is coupled to exchange data with the first I/O contact, and wherein the configuration logic is configured to prevent any communication between the second I/O contact group and the data channel; and a second mode wherein the first plurality of bit lines are each coupled to participate in data exchanges with the second I/O contact group, wherein the first bit line is coupled to exchange data with the second I/O contact, and wherein the configuration logic to prevent any communication between the first I/O contact group and the data channel; and configuring the selected one of the plurality of modes of the configuration logic.

11. The method of claim 10, wherein, for any mode of the plurality of modes that couples one I/O contact of the first I/O contact group to participate in data exchanges with the data channel, the mode couples each I/O contact of the first I/O contact group to participate in data exchanges with the data channel.

12. The method of claim 11, wherein, for any mode of the plurality of modes that couples one I/O contact of the first I/O contact group to participate in data exchanges with the data channel, the mode prevents any communication between the second I/O contact group and the data channel.

13. The method of claim 11, wherein, for any mode of the plurality of modes that couples one I/O contact of the second I/O contact group to participate in data exchanges with the data channel, the mode couples each I/O contact of the second I/O contact group to participate in data exchanges with the data channel.

14. The method of claim 13, wherein, for any mode of the plurality of modes that couples one I/O contact of the second I/O contact group to participate in data exchanges with the data channel, the mode prevents any communication between the first I/O contact group and the data channel.

15. The method of claim 10, wherein, for any mode of the plurality of modes, the mode prevents any communication between the data channel and at least one of the first I/O contact group and the second I/O contact group.

16. The method of claim 10, wherein the first plurality of bit lines includes bitlines corresponding to a nibble.

17. The method of claim 16, wherein the first plurality of bit lines each correspond to a respective bit of a byte including the nibble.

18. The method of claim 16, wherein the first plurality of bit lines each correspond to a respective bit of the nibble.

* * * * *